(12) United States Patent
Okamoto

(10) Patent No.: US 12,078,586 B2
(45) Date of Patent: Sep. 3, 2024

(54) MICROPARTICLE MEASUREMENT DEVICE, MICROPARTICLE SORTING DEVICE, MICROPARTICLE MEASUREMENT SYSTEM, AND MICROPARTICLE SORTING SYSTEM

(71) Applicant: SONY GROUP CORPORATION, Tokyo (JP)

(72) Inventor: Yoshiki Okamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 169 days.

(21) Appl. No.: 17/433,740

(22) PCT Filed: Jan. 16, 2020

(86) PCT No.: PCT/JP2020/001207
§ 371 (c)(1),
(2) Date: Aug. 25, 2021

(87) PCT Pub. No.: WO2020/179237
PCT Pub. Date: Sep. 10, 2020

(65) Prior Publication Data
US 2022/0146403 A1    May 12, 2022

(30) Foreign Application Priority Data
Mar. 6, 2019    (JP) .................. 2019-040421

(51) Int. Cl.
*G01N 15/1434* (2024.01)
*G01N 15/14* (2024.01)
(Continued)

(52) U.S. Cl.
CPC ....... *G01N 15/1434* (2013.01); *G02B 3/0006* (2013.01); *G02B 13/143* (2013.01); *G01N 15/149* (2024.01); *G01N 2015/1493* (2013.01)

(58) Field of Classification Search
None
See application file for complete search history.

(56) References Cited

U.S. PATENT DOCUMENTS 8,004,661 B2 *   8/2011   Luscher ................. C12M 47/04
                                                                       356/342
2007/0273886 A1   11/2007   Matsumoto et al.
(Continued)

FOREIGN PATENT DOCUMENTS

JP    06-235691 A    8/1994
JP    2001-183296 A   7/2001
(Continued)

OTHER PUBLICATIONS

International Search Report and Written Opinion of PCT Application No. PCT/JP2020/001207, issued on Mar. 17, 2020, 10 pages of ISRWO.

*Primary Examiner* — Rufus L Phillips
(74) *Attorney, Agent, or Firm* — CHIP LAW GROUP

(57) ABSTRACT

To provide a microparticle measurement technology capable of supporting excitation light in a wideband wavelength range.

The present technology provides a microparticle measurement device provided with a plurality of objective lenses for excitation light irradiation used for irradiating microparticles flowing through a flow path with excitation light, in which at least one of the objective lenses for excitation light irradiation is used for detecting scattered light emitted from the microparticles by the excitation light with which the microparticles are irradiated through another one of the objective lenses for excitation light irradiation.

5 Claims, 8 Drawing Sheets

(51) Int. Cl.
  *G01N 15/149*  (2024.01)
  *G02B 3/00*  (2006.01)
  *G02B 13/14*  (2006.01)

(56) References Cited

U.S. PATENT DOCUMENTS

| | | |
|---|---|---|
| 2009/0122311 A1 | 5/2009 | Kanda |
| 2012/0211679 A1* | 8/2012 | Heng ................... G01N 15/147 250/458.1 |
| 2012/0238032 A1* | 9/2012 | Durniak ............ B01L 3/502715 422/63 |
| 2013/0201322 A1* | 8/2013 | Park ...................... G02B 21/16 359/385 |
| 2013/0342838 A1* | 12/2013 | Kinugasa ........... G01N 15/1434 356/338 |
| 2014/0367315 A1* | 12/2014 | Gluckstad ......... B01L 3/502761 209/552 |
| 2015/0346474 A1 | 12/2015 | Iguchi |
| 2018/0188173 A1* | 7/2018 | Scarcelli ............ G01N 15/1463 |
| 2019/0070608 A1* | 3/2019 | Kikuchi ............. G01N 15/1463 |

FOREIGN PATENT DOCUMENTS

| | | |
|---|---|---|
| JP | 2007-046947 A | 2/2007 |
| JP | 2007-315761 A | 12/2007 |
| JP | 2010-085194 A | 4/2010 |
| JP | 2015-503736 A | 2/2015 |
| JP | 2016-012114 A | 1/2016 |
| WO | 2007/018087 A1 | 2/2007 |
| WO | 2013/097870 A1 | 7/2013 |

\* cited by examiner

MICROPARTICLE MEASUREMENT DEVICE, MICROPARTICLE SORTING DEVICE, MICROPARTICLE MEASUREMENT SYSTEM, AND MICROPARTICLE SORTING SYSTEM

CROSS REFERENCE TO RELATED APPLICATIONS

This application is a U.S. National Phase of International Patent Application No. PCT/JP2020/001207 filed on Jan. 16, 2020, which claims priority benefit of Japanese Patent Application No. JP 2019-040421 filed in the Japan Patent Office on Mar. 6, 2019. Each of the above-referenced applications is hereby incorporated herein by reference in its entirety.

TECHNICAL FIELD

The present technology relates to a microparticle measurement device. More specifically, this relates to a microparticle measurement device, a microparticle sorting device, a microparticle measurement system, and a microparticle sorting system for detecting optical information from microparticles flowing through a flow path.

BACKGROUND ART

In recent years, along with development in analytical methods, a method of allowing biological microparticles such as cells and microorganisms, microparticles such as microbeads and the like to flow through a flow path, and individually measuring the microparticles and analyzing or sorting the measured microparticles at a step of flowing has been developed.

As a representative example of such method of analyzing or sorting the microparticles, technological improvement of an analytical method referred to as flow cytometry is advancing rapidly. The flow cytometry is the analytical method of analyzing and sorting the microparticles by allowing microparticles to be analyzed to flow in a state being arrayed in a fluid and irradiating the microparticles with laser light and the like to detect fluorescence and scattered light emitted from each of the microparticles.

In the analysis of the microparticles represented by the flow cytometry and the like, an optical method is often used in which the microparticles to be analyzed are irradiated with light such as a laser and fluorescence or scattered light emitted from the microparticles are detected. Then, on the basis of detected optical information, a histogram is extracted by an analytical computer and software, and analysis is performed.

A device capable of performing multi-color analysis using a plurality of dyes is desired on the basis of demands of basic medicine and clinical fields in recent years. For example, Patent Document 1 discloses a sample analysis device provided with a flow cell for forming a sample flow and an imaging system for imaging particles contained in the sample flow in the flow cell to obtain a particle image, in which the imaging system includes a light source that irradiates the sample flow in the flow cell with near ultraviolet light and a camera that images the particles in the sample flow irradiated with the near ultraviolet light of the light source, the device capable of clearly imaging an outline of the particles such as red blood cells.

CITATION LIST

Patent Document

Patent Document 1: Japanese Patent Application Laid-Open No. 2010-85194

SUMMARY OF THE INVENTION

Problems to be Solved by the Invention

In order to use more fluorescent substances in a device capable of performing multi-color analysis using a plurality of dyes, it is necessary to be provided with a plurality of excitation light sources (for example, laser light sources). The number of fluorescence (the number of colors) that may be used by the device is increasing every day; for example, in a flow cytometer, it is necessary to support fluorescence in an ultraviolet region (specifically, excitation at a wavelength of 300 nm to 400 nm) and fluorescence in an infrared region (specifically, excitation at a wavelength of 700 nm to 800 nm) in addition to conventionally used fluorescence that shines at a wavelength of 400 nm to 700 nm, and the excitation light sources cover from the ultraviolet region to the infrared region.

However, an objective lens for excitation light irradiation used for irradiating a flow (stream) in which samples flow with the excitation light is mainly made using glass, and it is extremely difficult to correct chromatic aberration in order to support wideband wavelengths as described above.

Furthermore, since transmittance of optical glass used as the lens rapidly decreases on a shorter wavelength side from around 400 nm, the optical glass that may handle excitation light of a wavelength shorter than a wavelength of 400 nm is actually very limited, and it is difficult to correct the chromatic aberration. For this reason, there has been a problem that the objective lens for excitation light irradiation supporting the wideband wavelengths of 300 nm to 800 nm cannot be easily manufactured, for example.

Therefore, a principal object of the present technology is to provide a microparticle measurement technology capable of supporting excitation light in a wideband wavelength range.

Solutions to Problems

That is, the present technology first provides
a microparticle measurement device provided with:
a plurality of objective lenses for excitation light irradiation used for irradiating microparticles flowing through a flow path with excitation light, in which
at least one of the objective lenses for excitation light irradiation is used for detecting scattered light emitted from the microparticles by the excitation light with which the microparticles are irradiated through another one of the objective lenses for excitation light irradiation.

In the microparticle measurement device according to the present technology, at least two or more of the plurality of objective lenses for excitation light irradiation may be arranged so as to be substantially opposed to each other across the flow path.

In the microparticle measurement device according to the present technology, the plurality of objective lenses for excitation light irradiation may be used for irradiation of excitation light in different wavelength regions.

The microparticle measurement device according to the present technology may be provided with the objective lens for excitation light irradiation for visible region light, and the objective lens for excitation light irradiation for ultraviolet region light.

In this case, the objective lens for excitation light irradiation for ultraviolet region light may also be used for detecting scattered light in a visible region emitted from the microparticles.

At this time, the scattered light in the visible region emitted from the microparticles specifically is forward scattered light or side scattered light.

The present technology next provides
a microparticle sorting device provided with:
a plurality of objective lenses for excitation light irradiation used for irradiating microparticles flowing through a flow path with excitation light;
a light detection unit that detects florescence emitted from the microparticles; and
a sorting unit that sorts the microparticles on the basis of detected optical information, in which
at least one of the objective lenses for excitation light irradiation is used for detecting scattered light emitted from the microparticles by the excitation light with which the microparticles are irradiated through another one of the objective lenses for excitation light irradiation.

The microparticle sorting device according to the present technology may be provided with a plurality of light detection units.

The present technology further provides
a microparticle measurement system provided with:
a microparticle measurement device provided with
a plurality of objective lenses for excitation light irradiation used for irradiating microparticles flowing through a flow path with excitation light, and
a light detection unit that detects fluorescence emitted from the microparticles, in which
at least one of the objective lenses for excitation light irradiation is used for detecting scattered light emitted from the microparticles by the excitation light with which the microparticles are irradiated through another one of the objective lenses for excitation light irradiation; and
an analysis device that analyzes optical information detected by the light detection unit.

The present technology additionally provides
a microparticle sorting system provided with:
a microparticle sorting device provided with
a plurality of objective lenses for excitation light irradiation used for irradiating microparticles flowing through a flow path with excitation light,
a light detection unit that detects fluorescence emitted from the microparticles, and
a sorting unit that sorts the microparticles on the basis of detected optical information, in which
at least one of the objective lenses for excitation light irradiation is used for detecting scattered light emitted from the microparticles by the excitation light with which the microparticles are irradiated through another one of the objective lenses for excitation light irradiation; and
an analysis device that analyzes optical information detected by the light detection unit.

In the present technology, "microparticles" broadly include bio-related microparticles such as cells, microorganisms, and liposomes, synthetic particles such as latex particles, gel particles, and industrial particles or the like.

The bio-related microparticles include chromosomes forming various cells, liposomes, mitochondria, organelles (cell organelles) and the like. The cells include animal cells (such as blood cells) and plant cells. The microorganisms include bacteria such as *Escherichia coli*, viruses such as tobacco mosaic virus, fungi such as yeast and the like. Moreover, the bio-related microparticles may also include bio-related polymers such as nucleic acids, proteins, and complexes thereof.

Furthermore, the industrial particles may be, for example, an organic or inorganic polymer material, metal and the like. The organic polymer material includes polystyrene, styrene/divinylbenzene, polymethyl methacrylate and the like. The inorganic polymer material includes glass, silica, a magnetic material and the like. The metal includes gold colloid, aluminum and the like. In general, shapes of the microparticles are generally spherical, but they may be non-spherical, and its size, mass and the like are also not especially limited.

MODE FOR CARRYING OUT THE INVENTION

Figure 1:
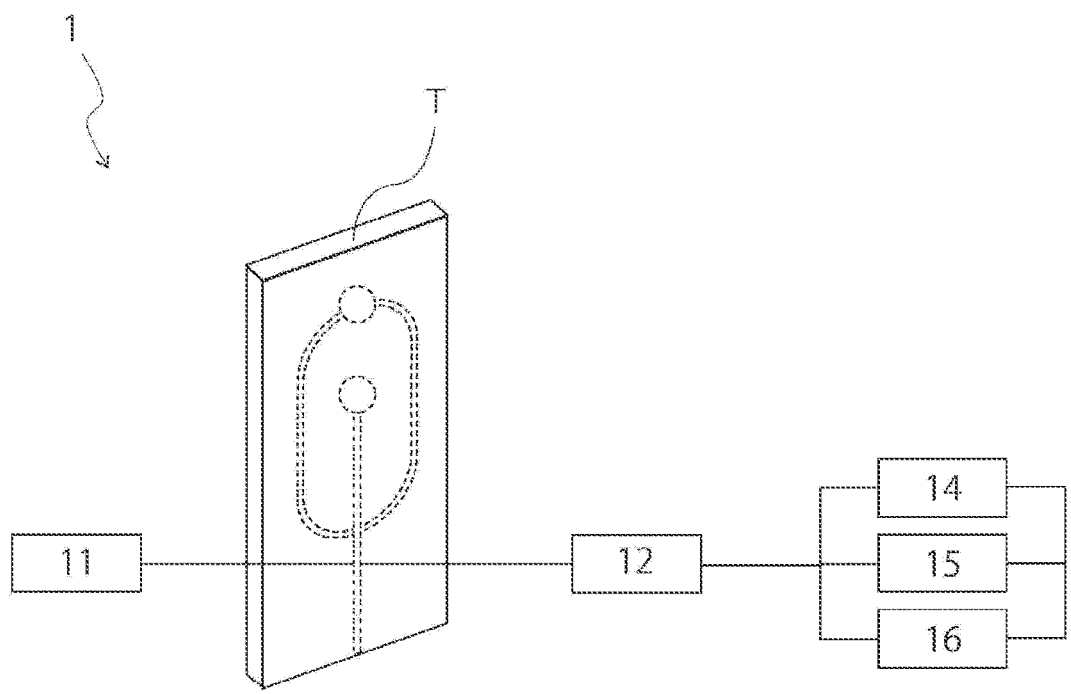
FIG. 1 is a schematic conceptual diagram schematically illustrating a first embodiment of a microparticle measurement device 1 according to the present technology.

Hereinafter, a preferred mode for carrying out the present technology is described with reference to the drawings. An embodiment hereinafter described illustrates an example of a representative embodiment of the present technology, and the scope of the present technology is not narrowed by this. Note that, the description is given in the following order.

1. Microparticle measurement device 1 and microparticle sorting device 2
    (1) Flow path P
    (2) Light irradiation unit 11
    (3) Light detection unit 12
    (4) Objective lens L
    (5) Sorting unit 13
    (6) Analysis unit 14
    (7) Storage unit 15
    (8) Display unit 16
2. Microparticle measurement system 3 and microparticle sorting system 4

<1. Microparticle Measurement Device 1 and Microparticle Sorting Device 2>

A microparticle measurement device 1 according to the present technology is at least provided with a plurality of objective lenses for excitation light irradiation L1. A microparticle sorting device 2 according to the present technology is at least provided with a plurality of objective lenses for excitation light irradiation L1, a light detection unit 12, and a sorting unit 13. Furthermore, the microparticle measurement device 1 and the microparticle sorting device 2 according to the present technology may be provided with an objective lens for fluorescence detection L2, a flow path P, a light irradiation unit 11, an analysis unit 14, a storage unit 15, a display unit 16 and the like as necessary. Hereinafter, each unit is described in detail along time series of measurement.

Figure 2:
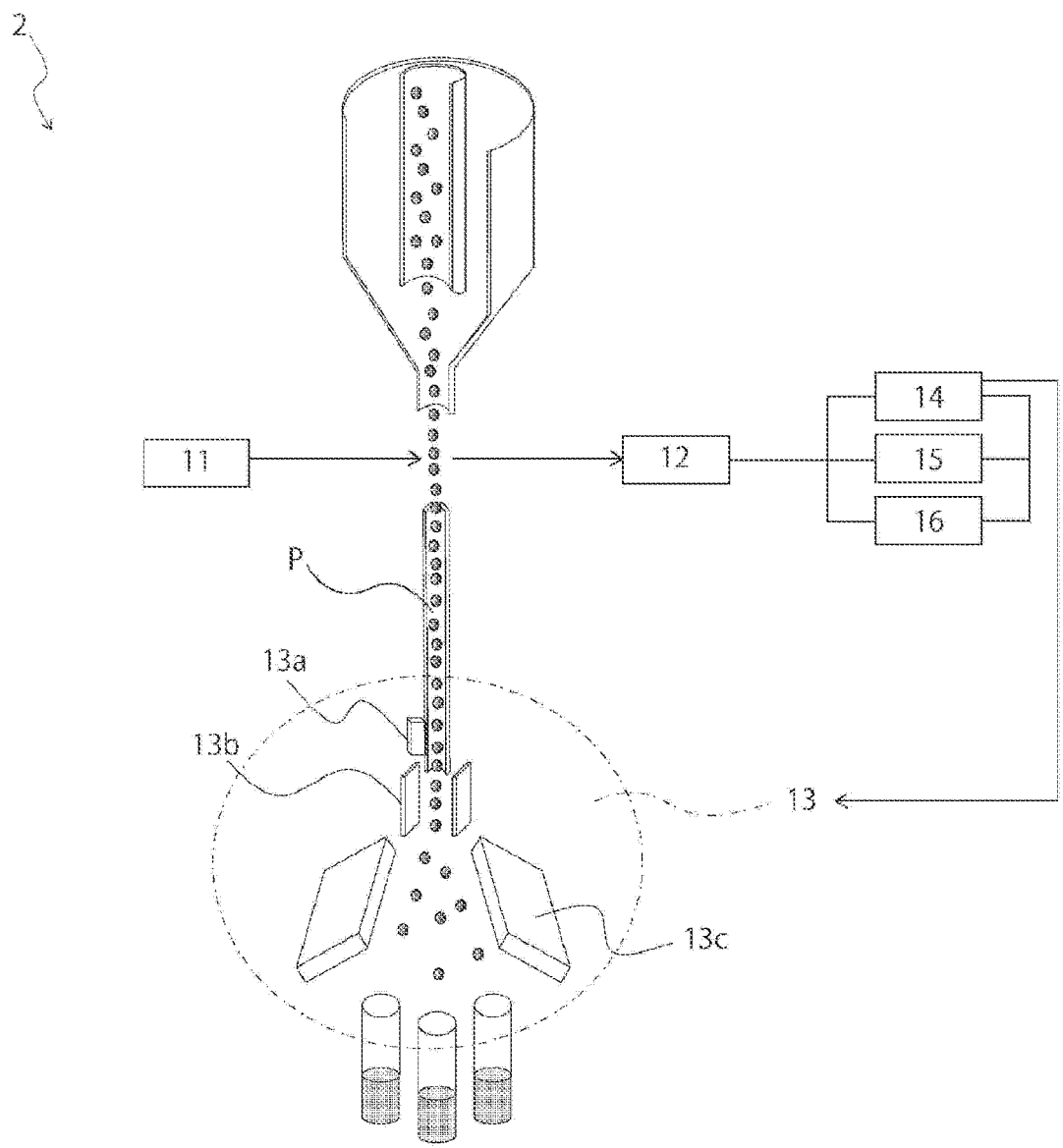
FIG. 2 is a schematic conceptual diagram schematically illustrating a second embodiment of a microparticle sorting device 2 according to the present technology.
Figure 3:
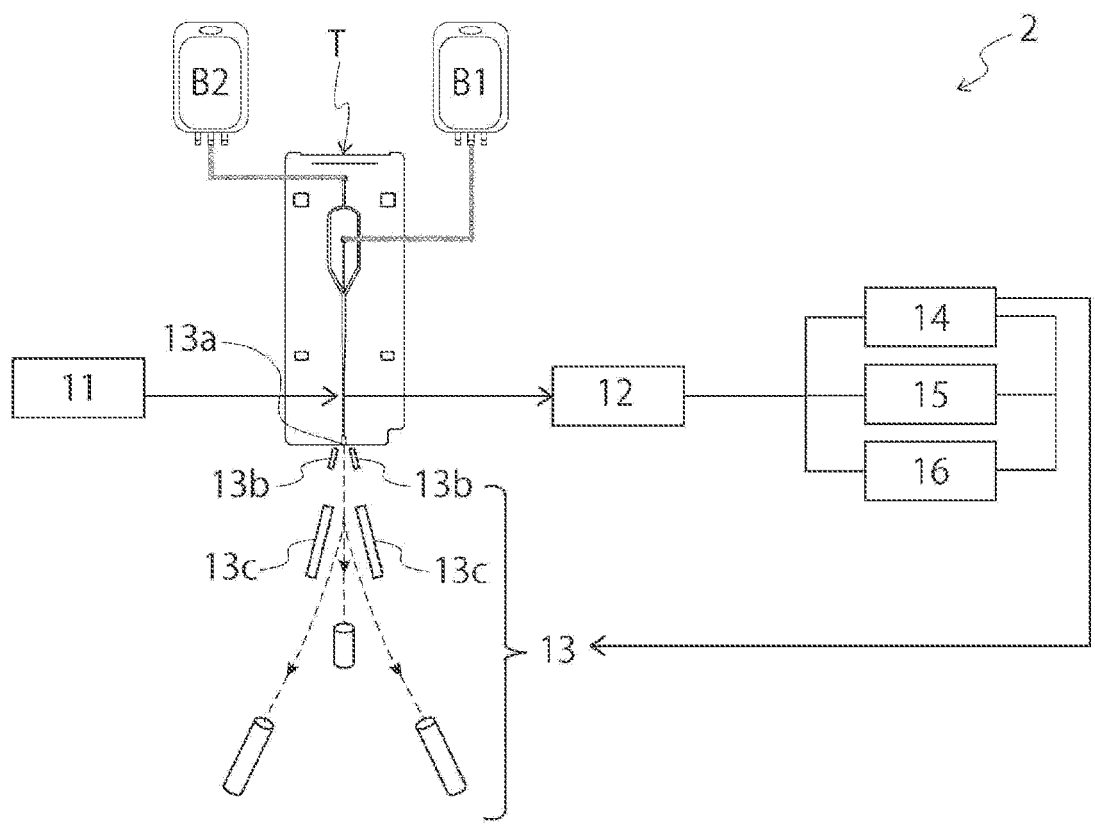
FIG. 3 is a schematic conceptual diagram schematically illustrating a second embodiment of the microparticle sorting device 2 according to the present technology.
Figure 4:
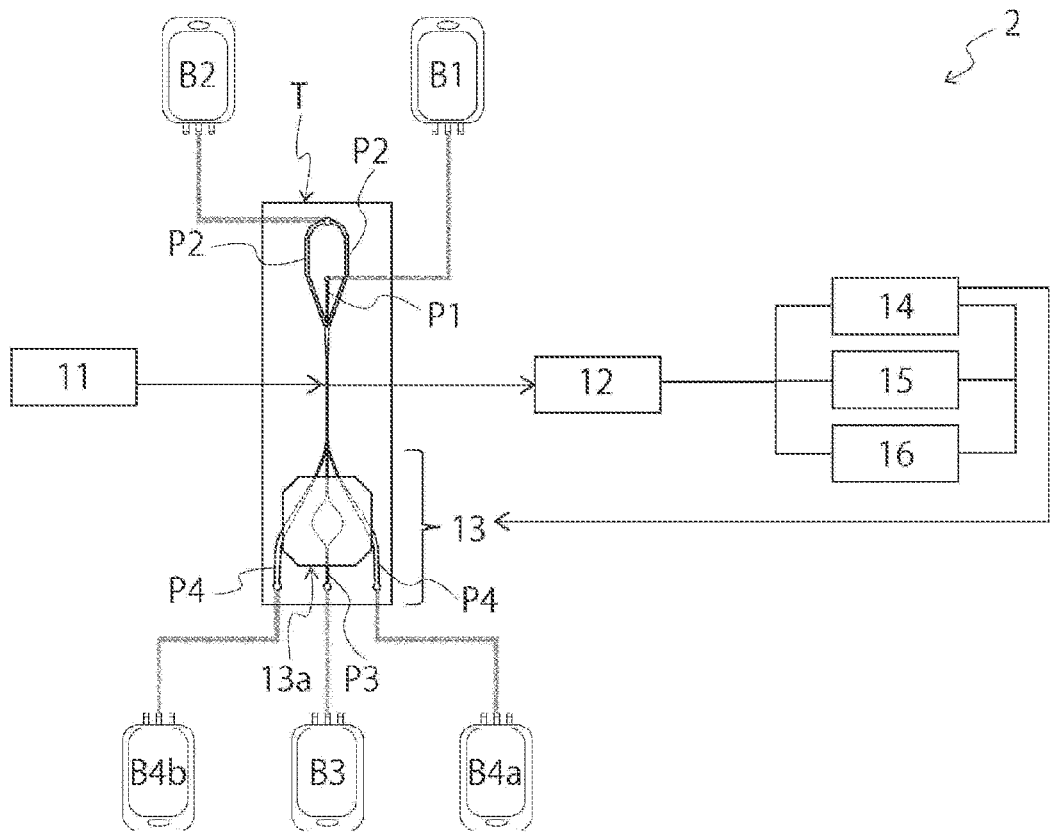
FIG. 4 is a schematic conceptual diagram schematically illustrating a third embodiment of the microparticle sorting device 2 according to the present technology.

FIG. 1 is a schematic conceptual diagram schematically illustrating an entire structure of a first embodiment of the microparticle measurement device 1 according to the present technology, FIG. 2 is a schematic conceptual diagram schematically illustrating an entire structure of a first embodiment of the microparticle sorting device 2 according to the present technology, FIG. 3 is a schematic conceptual diagram schematically illustrating an entire structure of a second embodiment of the microparticle sorting device 2 according to the present technology, and FIG. 4 is a schematic conceptual diagram schematically illustrating an entire structure of a third embodiment of the microparticle sorting device 2 according to the present technology. Note that FIGS. 1 to 4 schematically illustrate the entire structures of the microparticle measurement device 1 and the microparticle sorting device 2 according to the present technology, in which the objective lenses L such as the plurality of objective lenses for excitation light irradiation L1 and the objective lens for fluorescence detection L2 indispensable for the microparticle measurement device 1 and the microparticle sorting device 2 according to the present technology are not illustrated. The objective lenses L such as the objective lenses for excitation light irradiation L1 and the objective lens for fluorescence detection L2 are illustrated in schematic conceptual diagrams schematically illustrating an example of an arrangement relationship between the objective lenses L and the flow path P in FIGS. 5 to 8.

(1) Flow Path P

The microparticle measurement device 1 according to the present technology is a device that detects optical information emitted from microparticles flowing through the flow path P. Furthermore, the microparticle sorting device 2 according to the present technology is a device that detects the optical information emitted from the microparticles flowing through the flow path P and sorts the microparticles on the basis of a detection result. Although the microparticle measurement device 1 may be provided with the flow path P in advance, it is also possible to use a commercially available flow path P, a disposable tip provided with the flow path P and the like.

A form of the flow path P is not especially limited, and may be freely designed. For example, this is not limited to the flow path P formed in a two-dimensional or three-dimensional substrate T of plastic, glass and the like as in the microparticle measurement device 1 according to the first embodiment illustrated in FIGS. 1, 3, and 4 and the microparticle sorting device 2 according to the second and third embodiments, and the flow path P used in a conventional flow cytometer and the like as in the microparticle sorting device 2 according to the first embodiment illustrated in FIG. 2 may also be used in the microparticle measurement device 1 and the microparticle sorting device 2 according to the present technology.

Furthermore, a flow path width, a flow path depth, and a flow path cross-sectional shape of the flow path P are not especially limited as long as a laminar flow may be formed, and may be freely designed. For example, a micro flow path having the flow path width of 1 mm or smaller may also be used in the microparticle measurement device 1 according to the present technology. Especially, the micro flow path having the flow path width of about 10 μm or larger and 1 mm or smaller is more preferably used in the microparticle measurement device 1 and the microparticle sorting device 2 according to the present technology.

The microparticles allowed to flow through the flow path P may be labeled with one or two or more dyes such as fluorescent dyes. In this case, the fluorescent dyes available in the present technology include, for example, Cascade Blue, Pacific Blue, fluorescein isothiocyanate (FITC), phycoerythrin (PE), propidium iodide (PI), Texas Red (TR), peridinin chlorophyll protein (PerCP), allophycocyanin (APC), 4',6-diamidino-2-phenylindole (DAPI), Cy3, Cy5, Cy7, Brilliant Violet (BV421) and the Like.

(2) Light Irradiation Unit 11

The microparticle measurement device 1 and the microparticle sorting device 2 according to the present technology may be provided with the light irradiation unit 11. The light irradiation unit 11 irradiates the microparticles flowing through the flow path P with light. In the microparticle measurement device 1 and the microparticle sorting device 2 according to the present technology, the light irradiation unit 11 is not indispensable, and it is also possible to irradiate the microparticles flowing through the flow path P with light by using an external light irradiation device and the like.

A type of the light applied from the light irradiation unit 11 is not especially limited, but in order to surely generate fluorescence or scattered light from the microparticles, light having constant light direction, wavelength, and light intensity is desirable. There may be a laser, an LED and the like as an example. In a case of using the laser, a type thereof is not especially limited, and it is possible to freely combine one or two or more of an argon ion (Ar) laser, a helium-neon (He—Ne) laser, a dye laser, a krypton (Cr) laser, a semiconductor laser, a solid-state laser obtained by combining the semiconductor laser and a wavelength conversion optical element or the like to use.

The microparticle measurement device 1 and the microparticle sorting device 2 according to the present technology may adopt a so-called multi-spot. That is, a plurality of positions of the flow path P may be irradiated with light. In a case of adopting the multi-spot, a plurality of light irradiation units 11 may be provided, and it is also possible to split light from one light irradiation unit 11 through a light control unit such as a spectroscope to irradiate the plurality of positions of the flow path P with light.

(3) Light Detection Unit 12

The light detection unit 12 detects the optical information emitted from the microparticles flowing through the flow path P. In the microparticle measurement device 1 according to the present technology, the light detection unit 12 is not indispensable, and it is also possible to detect the optical information emitted from the microparticles flowing through the flow path P by using an external light detection device and the like.

As long as the light detection unit 12 that may be used in the microparticle measurement device 1 and the microparticle sorting device 2 according to the present technology may detect optical signals from the microparticles, a specific light detection method thereof is not especially limited, and it is possible to freely select the light detection method used in the well-known light detector to adopt. For example, it is possible to freely combine one or two or more of the light detection methods used in a fluorescence measuring instrument, a scattered light measuring instrument, a transmitted light measuring instrument, a reflected light measuring instrument, a diffracted light measuring instrument, an ultraviolet spectroscopic measuring instrument, an infrared spectroscopic measuring instrument, a Raman spectroscopic measuring instrument, a FRET measuring instrument, a FISH measuring instrument and other various spectrum measuring instruments, a PMT array or a photodiode array in which light receiving elements such as PMTs and photodiodes are one-dimensionally arranged, those in which a plurality of independent detection channels such as two-dimensional light receiving elements such as CCD or CMOS is arranged or the like to adopt.

Furthermore, a plurality of light detection channels may be provided on the light detection unit 12 of the microparticle measurement device 1 and the microparticle sorting device 2 according to the present technology.

(4) Objective Lens L

Figure 5:
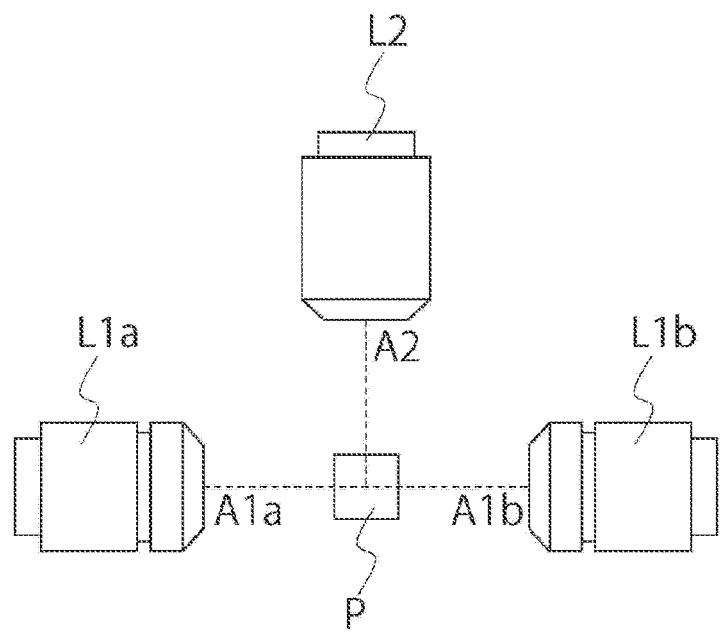
FIG. 5 is a schematic conceptual diagram schematically illustrating an example of an arrangement relationship between objective lenses L and a flow path P used in the microparticle measurement device 1 and the microparticle sorting device 2 according to the present technology.

FIG. 5 is the schematic conceptual diagram schematically illustrating the example of the arrangement relationship between the objective lenses L and the flow path P used in the microparticle measurement device 1 and the microparticle sorting device 2 according to the present technology. The microparticle measurement device 1 and the microparticle sorting device 2 according to the present technology are provided with a plurality of objective lenses for excitation light irradiation L1a and L1b and the objective lens for fluorescence detection L2. The plurality of objective lenses for excitation light irradiation L1a and L1b is used for irradiating the microparticles with excitation light. The objective lens for fluorescence detection L2 is used for detecting fluorescence emitted from the microparticles.

In the microparticle measurement device 1 and the microparticle sorting device 2 according to the present technology, the plurality of objective lenses for excitation light irradiation L1a and L1b is used for irradiating the microparticles flowing through the flow path P with the excitation light. For example, by using the objective lenses for excitation light irradiation L1a and L1b for irradiation of the excitation light in different wavelength regions, it becomes possible to support multi-color analysis using a plurality of dyes.

More specifically, chromatic aberration correction of each lens becomes easy by separating the objective lenses for excitation light irradiation into the lens for long-wavelength excitation light and the lens for short-wavelength excitation light; for example, the objective lens for excitation light irradiation L1a for visible region light and the objective lens for excitation light irradiation L1b for ultraviolet region light. In general, the chromatic aberration correction of the lens is often performed by using a plurality of lenses made by using optical glasses having different refractive indexes; however, according to the present technology, the number of lenses used for the chromatic aberration correction may be reduced, so that it is possible to contribute to downsizing of the device, improve transmittance of the excitation light, and exhibit an effect of enabling more accurate measurement and sorting.

The objective lens for excitation light irradiation L1a and the objective lens for excitation light irradiation L1b may be arranged in positions substantially opposed to each other across the flow path P. The "positions substantially opposed to each other across the flow path P" are not limited to positions in which an optical axis A1a of the objective lens for excitation light irradiation L1a and an optical axis A1b of the objective lens for excitation light irradiation L1b are coaxial with each other across the flow path P as in the example illustrated in FIG. 5, and it is also possible to arrange such that the optical axis A1a of the objective lens for excitation light irradiation L1a and the optical axis A1b of the objective lens for excitation light irradiation L1b intersect with each other at a predetermined angle as in the example illustrated in FIG. 6 as long as there is no influence on the irradiation of the microparticles with the excitation light using the objective lenses L1a and L1b and the detection of the fluorescence emitted from the microparticles. More specifically, it is possible to arrange in a range in which the optical axes A1a and A1b of the objective lenses for excitation light irradiation L1a and L1b are at an angle of +30 to −30, more preferably +10 to −10 with respect to a perpendicular line N in the irradiation position of the flow path P.

Furthermore, the objective lens for excitation light irradiation L1a and the objective lens for excitation light irradiation L1b may be arranged in positions in which the optical axis A1a of the objective lens for excitation light irradiation L1a and the optical axis A1b of the objective lens for excitation light irradiation L1b are displaced with each other in any one of a width direction, a depth direction, and a flow direction of the flow path P not illustrated as long as they may be used for detecting the scattered light emitted from the microparticles by the excitation light with which the microparticles are irradiated through mutual lenses.

In the microparticle measurement device 1 and the microparticle sorting device 2 according to the present technology, it is also possible to arrange such that the optical axes A1a and A1b of the objective lenses for excitation light irradiation L1a and L1b are not coaxial with the optical axis A2 of the objective lens for fluorescence detection L2. Since the optical axes A1a and A1b of the objective lenses for excitation light irradiation L1a and L1b are not coaxial with the optical axis A2 of the objective lens for fluorescence detection L2, the excitation light and the fluorescence may be separated from each other, and detection of noise caused by the excitation light by the objective lens for fluorescence detection L2 may be reduced. As a result, detection accuracy may be improved.

Figure 6:
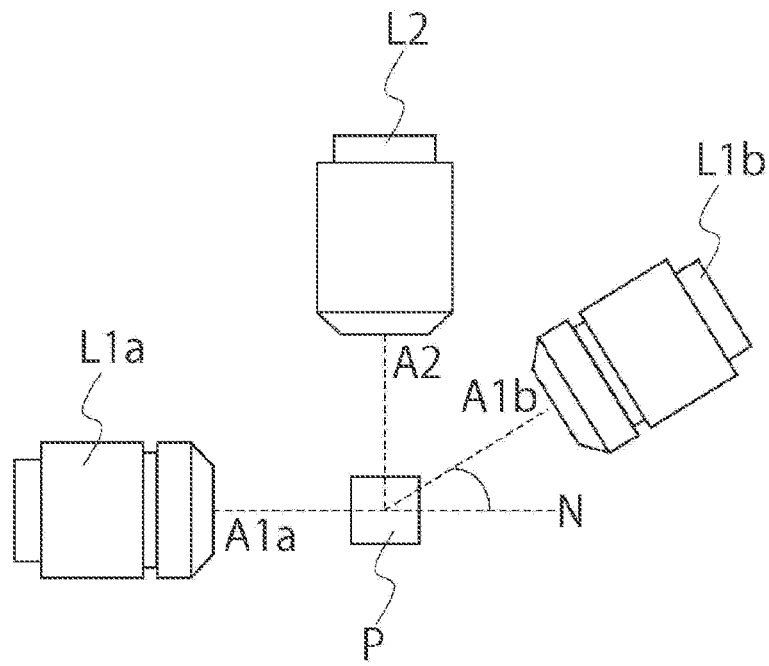
FIG. 6 is a schematic conceptual diagram schematically illustrating an example different from that in FIG. 5 of the arrangement relationship between the objective lenses L and the flow path P used in the microparticle measurement device 1 and the microparticle sorting device 2 according to the present technology.
Figure 7:
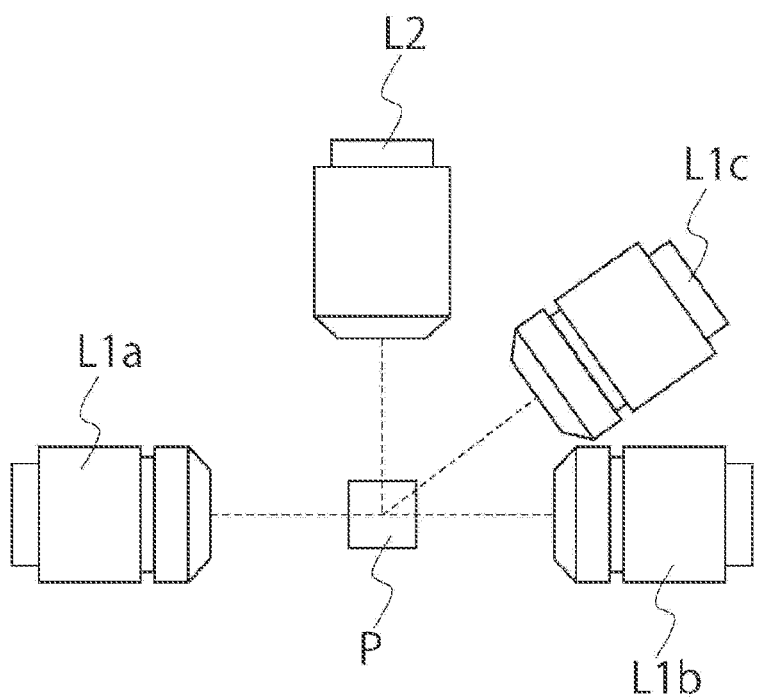
FIG. 7 is a schematic conceptual diagram schematically illustrating an example different from that in FIGS. 5 and 6 of the arrangement relationship between the objective lenses L and the flow path P used in the microparticle measurement device 1 and the microparticle sorting device 2 according to the present technology.
Figure 8:
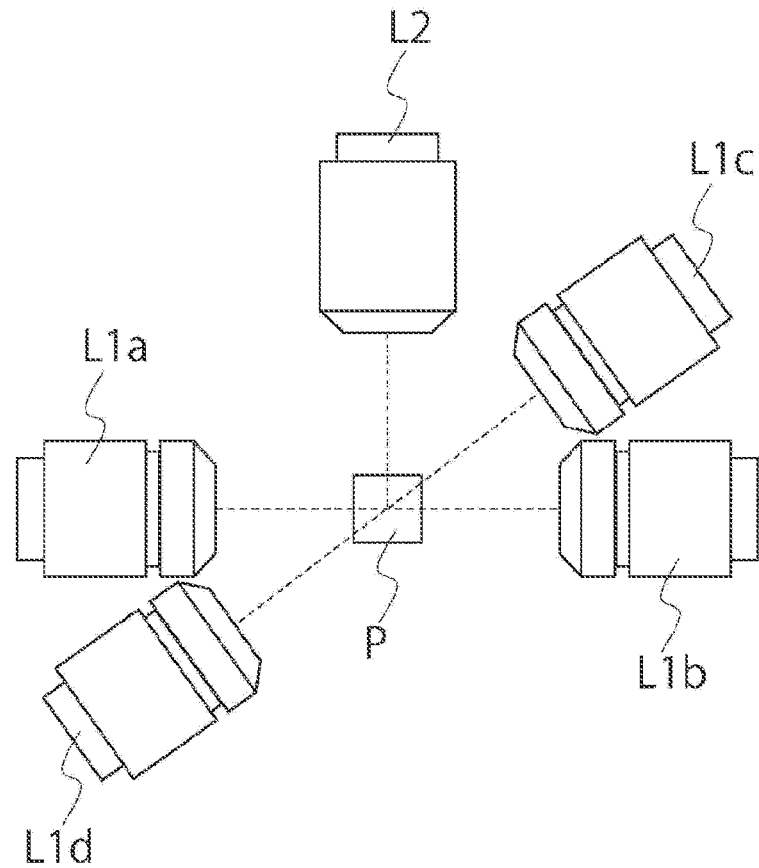
FIG. 8 is a schematic conceptual diagram schematically illustrating an example different from that in FIGS. 5 to 7 of the arrangement relationship between the objective lenses L and the flow path P used in the microparticle measurement device 1 and the microparticle sorting device 2 according to the present technology.

The number of the objective lenses for excitation light irradiation L1 is not limited to two as in the examples illustrated in FIGS. 5 and 6, and may be three as in the example illustrated in FIG. 7, four as illustrated in FIG. 8, or five or more although not illustrated. As the number of the objective lenses for excitation light irradiation L1 is increased, the chromatic aberration correction of each lens becomes easier, and more accurate measurement and sorting become possible.

Figure 9:
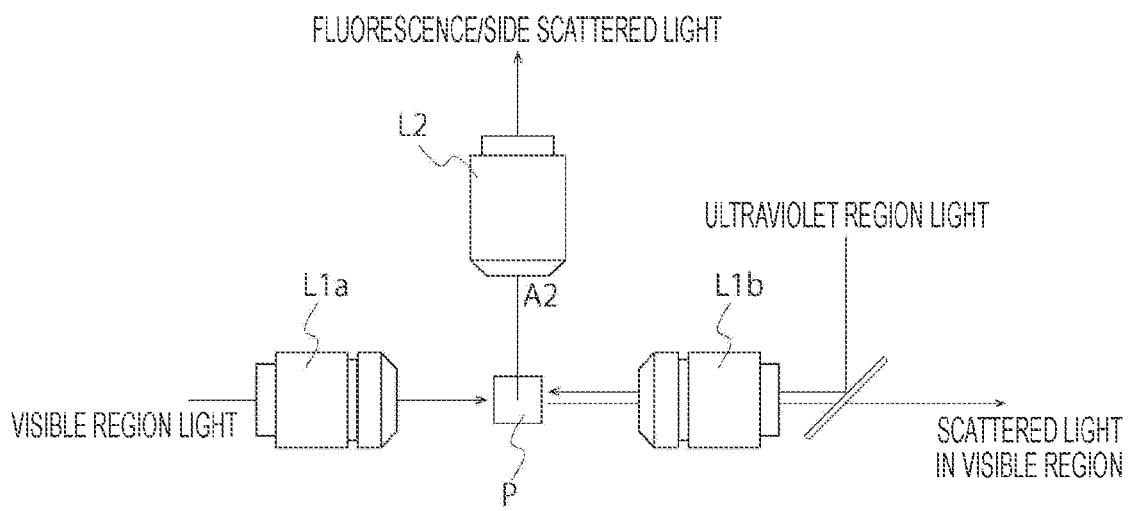
FIG. 9 is a schematic conceptual diagram schematically illustrating an example of a method of detecting scattered light using the microparticle measurement device 1 and the microparticle sorting device 2 according to the present technology.

Furthermore, a part of each objective lens for excitation light irradiation or an entire thereof is also used for detecting the scattered light emitted from the microparticles. In a normal flow cytometer, in order to improve detection accuracy, a photodetector and the like is arranged on an opposed side of the objective lens for excitation light irradiation to detect criterial forward scattered light; however, for example, as illustrated in FIG. 9, it is desirable to arrange the objective lens for excitation light irradiation L1a for the visible region light and the objective lens for excitation light irradiation L1b for the ultraviolet region light in positions substantially opposed to each other across the flow path P, and use the objective lens for excitation light irradiation L1b for the ultraviolet region light for detecting the scattered light in the visible region emitted from the microparticles by irradiation of the visible region light using the objective lens for excitation light irradiation L1a. This makes it possible to easily apply the ultraviolet region light without increasing the number of lenses and without adopting a complicated optical system. As a result, it is possible to obtain further effects such as downsizing of the device and improvement in degree of freedom in designing correction of the excitation light for the ultraviolet region light.

Figure 10:
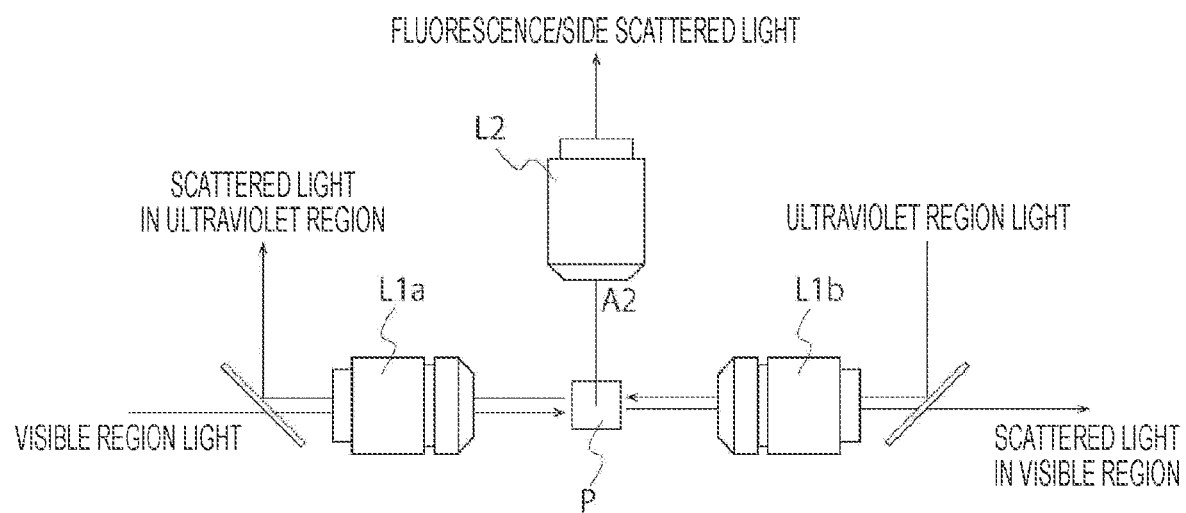
FIG. 10 is a schematic conceptual diagram schematically illustrating an example of a method of detecting scattered light using the microparticle measurement device 1 and the microparticle sorting device 2 according to the present technology.

Furthermore, recently, a technology of detecting the scattered light in a shorter wavelength region has been developed in order to further improve the detection accuracy, so that, for example, as illustrated in FIG. 10, it is also possible to arrange the objective lens for excitation light irradiation L1a for the visible region light and the objective lens for excitation light irradiation L1b for the ultraviolet region light in positions substantially opposed to each other across the flow path P, and use the objective lens for excitation light irradiation L1b for the ultraviolet region light for detecting the scattered light in the visible region emitted from the microparticles, and use the objective lens for excitation light irradiation L1a for the visible region light for detecting the scattered light in the ultraviolet region emitted from the microparticles.

Note that, in FIGS. 9 and 10, the objective lens for fluorescence detection L2 is used for detecting each side scattered light, and the objective lenses for excitation light irradiation L1a and L1b are used for detecting each forward scattered light; however, by changing the arrangement of the objective lenses for excitation light irradiation L1a and L1b (not illustrated), it becomes possible to use the objective lenses for excitation light irradiation L1a and L1b for detecting each side scattered light.

(5) Sorting Unit 13

The microparticle sorting device 2 according to the present technology is provided with the sorting unit 13 that sorts the microparticles. The sorting unit 13 sorts the microparticles on the basis of data analyzed by the analysis unit 14 to be described later from a value detected by the light detection unit 12. For example, the sorting unit 13 may sort the microparticles downstream the flow path P on the basis of an analysis result such as a size, a form, and an internal structure of the microparticles derived from analysis data.

More specifically, as in the first and second embodiments illustrated in FIGS. 2 and 3, for example, vibration is applied to an entire flow path P or a part thereof by using a vibration element 13a and the like that vibrates at a predetermined vibration frequency, thereby generating a droplet from a discharge port of the flow path P. Note that, in this case, the vibration element 13a to be used is not especially limited, and any well-known one may be freely selected and used. As an example, there may be a piezo vibration element and the like. Furthermore, it is possible to adjust a size of the droplet and generate the droplet containing a certain amount of microparticles by adjusting a liquid sending amount to the flow path P, a diameter of the discharge port, a vibration frequency of the vibration element and the like.

Next, it is charged with a positive or negative charge on the basis of the analysis result such as the size, form, and internal structure of the microparticles analyzed on the basis of the data analyzed by the analysis unit 14 (refer to reference sign 13b in FIGS. 2 and 3). Then, the charged droplet a pathway of which is changed in a desired direction by a counter electrode 13c to which a voltage is applied is sorted.

Furthermore, as in the third embodiment illustrated in FIG. 4, three branching flow paths of a sorting flow path P3 and two disposing flow paths P4 are provided downstream the flow path P formed in the substrate T, the microparticles to be sorted that are determined to satisfy a predetermined optical characteristic are taken into the sorting flow path P3 and the microparticles not to be sorted that are determined not to satisfy a predetermined optical characteristic are not taken into the sorting flow path P3 and flow to any one of the two disposing flow paths P4, so that they may be sorted.

The microparticles to be sorted may be taken into the sorting flow path P3 by using a well-known method; for example, by generating a negative pressure in the sorting flow path P3 by the vibration element 13a such as the piezo element and sucking the sample liquid containing the microparticles to be sorted and a sheath liquid into the sorting flow path P3 by utilizing the negative pressure. Furthermore, although not illustrated, it is also possible to take the microparticles to be sorted into the sorting flow path P3 by controlling or changing a laminar flow direction by using a valve electromagnetic force, a fluid stream (gas or liquid) or the like.

In the third embodiment, as illustrated in the schematic conceptual diagram in FIG. 4, by connecting a sample liquid storage unit B1 to a sample liquid flow path P1, a sheath liquid storage unit B2 to a sheath liquid flow path P2, a sorted liquid storage unit B3 to the sorting flow path P3, and a waste liquid storage unit B4 to the disposing flow path P4 in a communicating manner, a completely closed sorting device may be realized. For example, in a case where the microparticles to be sorted are cells and the like for use in a cell preparation and the like, in order to maintain a sterilized environment and prevent contamination, a completely closed type design (isolated from an external environment) as in the third embodiment is preferable.

(6) Analysis Unit 14

The microparticle measurement device 1 and the microparticle sorting device 2 according to the present technology may further be provided with the analysis unit 14 as necessary. The analysis unit 14 is connected to the light detection unit 12 and analyzes the optical information detected from the microparticles by the light detection unit 12.

For example, the analysis unit 14 calculates a feature amount of each microparticle from the optical information of light received from the light detection unit 12. Specifically, the feature amount indicating the size, form, internal structure and the like of the microparticles is calculated from detected values of received fluorescence and scattered light.

Note that, the analysis unit 14 is not indispensable in the microparticle measurement device 1 and the microparticle sorting device 2 according to the present technology, and it is also possible to analyze a state and the like of the microparticles by using an external analysis device and the like on the basis of the optical information detected by the light detection unit 12. For example, the analysis unit 14 may be implemented by a personal computer or a CPU, and may be stored as a program in a hardware resource provided with a recording medium (for example, a non-volatile memory (USB memory), a HDD, a CD and the like) and the like and allowed to function by the personal computer or CPU. Furthermore, the analysis unit 14 may be connected to each unit of the microparticle measurement device 1 and the microparticle sorting device 2 via a network.

(7) Storage Unit 15

The microparticle measurement device 1 and the microparticle sorting device 2 according to the present technology may be provided with the storage unit 15 in which various pieces of information are stored. The storage unit 15 may store all items regarding the measurement such as the value detected by each of the light detection units 12, the analysis data generated by the analysis unit 14 and the like.

In the microparticle measurement device 1 and the microparticle sorting device 2 according to the present technology, the storage unit 15 is not indispensable, and an external storage device may also be connected. As the storage unit 15, for example, a hard disk and the like may be used.

(8) Display Unit 16

The microparticle measurement device 1 and the microparticle sorting device 2 according to the present technology may be provided with the display unit 16 that displays various types of information. The display unit 16 may display all items regarding the measurement such as the value detected by each of the light detection unit 12, the analysis data generated by the analysis unit 14 and the like.

In the microparticle measurement device 1 and the microparticle sorting device 2 according to the present technology, the display unit 16 is not indispensable, and an external display device may also be connected. As the display unit 16, for example, a display, a printer and the like may be used.

<2. Microparticle Measurement System 3 and Microparticle Sorting System 4>

Figure 11:
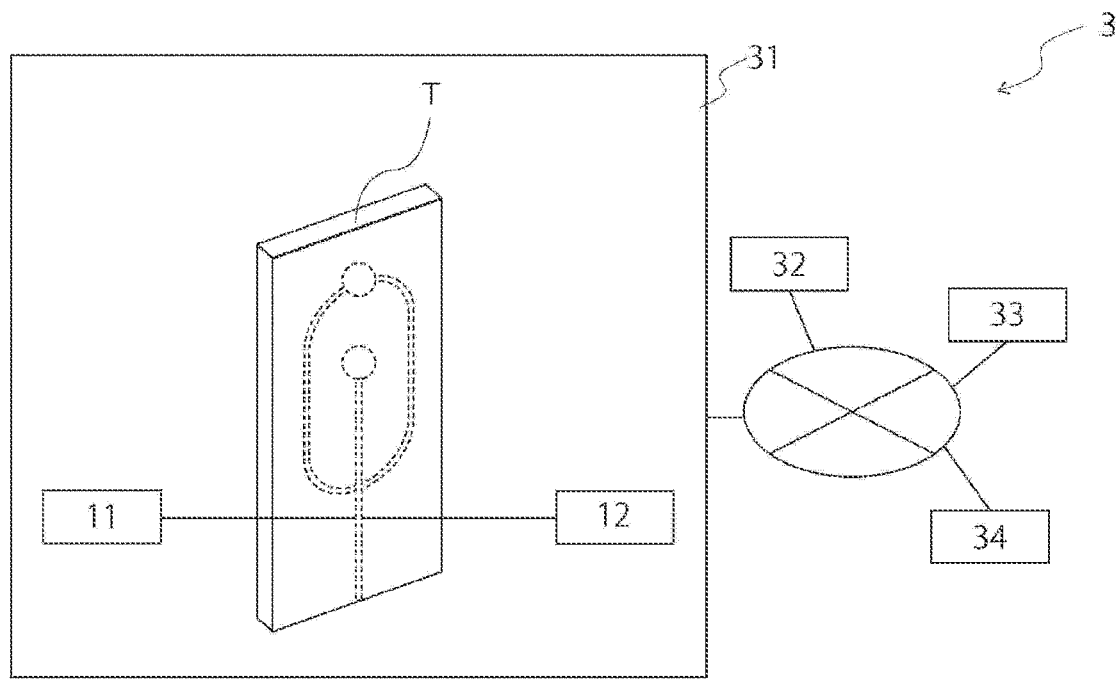
FIG. 11 is a schematic conceptual diagram schematically illustrating a first embodiment of a microparticle measurement system 3 according to the present technology.
Figure 12:
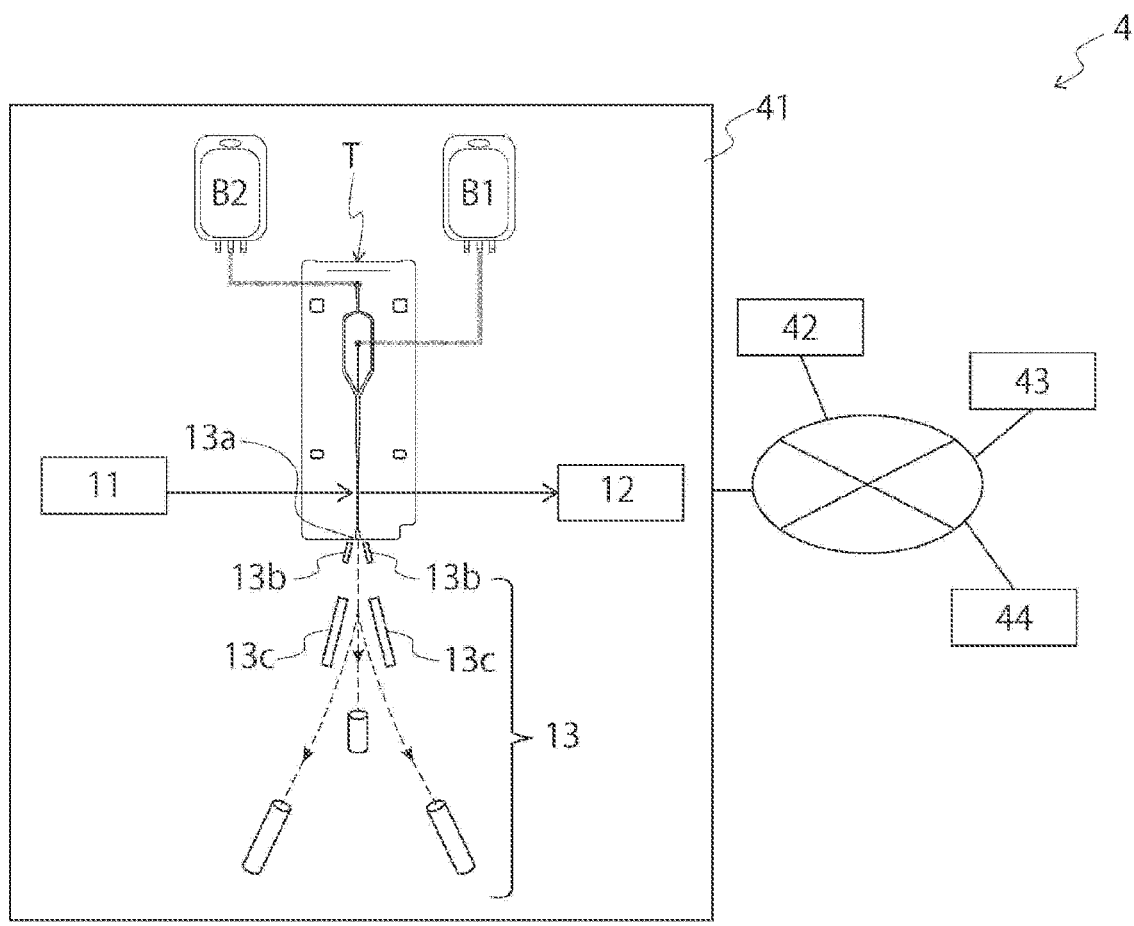
FIG. 12 is a schematic conceptual diagram schematically illustrating a first embodiment of a microparticle sorting system 4 according to the present technology.

FIG. 11 is a schematic conceptual diagram schematically illustrating a first embodiment of a microparticle measurement system 3 according to the present technology, and FIG. 12 is a schematic conceptual diagram schematically illustrating a first embodiment of a microparticle sorting system 4 according to the present technology. The microparticle measurement system 3 according to the present technology is at least provided with a microparticle measurement device 31 and an analysis device 32. Furthermore, the microparticle sorting system 4 according to the present technology is at least provided with a microparticle sorting device 41 and an analysis device 42. Furthermore, the microparticle measurement system 3 and the microparticle sorting system 4 according to the present technology may be provided with storage devices 33 and 43, display devices 34 and 44 and the like, respectively, as necessary.

The microparticle measurement system 3 and the microparticle sorting system 4 according to the present technology may be systems in which the microparticle measurement device 31 or the microparticle sorting device 41, the analysis device 32 or 42, the storage device 33 or 43, and the display device 34 or 44 are connected to each other via a network.

Note that the microparticle measurement device 31, the microparticle sorting device 41, the analysis devices 32 and 42, the storage devices 33 and 43, and the display devices 34 and 44 in the microparticle measurement system 3 and the microparticle sorting system 4 according to the present technology are the same as the details of the microparticle measurement device 1, the microparticle sorting device 2, the analysis unit 14, the storage unit 15, and the display unit 16 according to the present technology described above, respectively, so that the description thereof is herein omitted.

Note that the present technology may also take the following configuration.

(1)

A microparticle measurement device provided with:
 a plurality of objective lenses for excitation light irradiation used for irradiating microparticles flowing through a flow path with excitation light, in which
 at least one of the objective lenses for excitation light irradiation is used for detecting scattered light emitted from the microparticles by the excitation light with which the microparticles are irradiated through another one of the objective lenses for excitation light irradiation.

(2)

The microparticle measurement device according to (1), in which at least two or more of the plurality of objective lenses for excitation light irradiation are substantially opposed to each other across the flow path.

(3)

The microparticle measurement device according to (1) or (2), in which the plurality of objective lenses for excitation light irradiation is used for irradiation of excitation light in different wavelength regions.

(4)

The microparticle measurement device according to any one of (1) to (3), further provided with: the objective lens for excitation light irradiation for visible region light; and the objective lens for excitation light irradiation for ultraviolet region light.

(5)

The microparticle measurement device according to (4), in which the objective lens for excitation light irradiation for ultraviolet region light is also used for detecting scattered light in a visible region emitted from the microparticles.

(6)

The microparticle measurement device according to (5), in which the scattered light in the visible region emitted from the microparticles is forward scattered light or side scattered light.

(7)
A microparticle sorting device provided with:
a plurality of objective lenses for excitation light irradiation used for irradiating microparticles flowing through a flow path with excitation light;
a light detection unit that detects florescence emitted from the microparticles; and
a sorting unit that sorts the microparticles on the basis of detected optical information, in which
at least one of the objective lenses for excitation light irradiation is used for detecting scattered light emitted from the microparticles by the excitation light with which the microparticles are irradiated through another one of the objective lenses for excitation light irradiation.

(8)
The microparticle sorting device according to (7), further provided with: a plurality of light detection units.

(9)
A microparticle measurement system provided with:
a microparticle measurement device provided with
a plurality of objective lenses for excitation light irradiation used for irradiating microparticles flowing through a flow path with excitation light, and
a light detection unit that detects fluorescence emitted from the microparticles, in which
at least one of the objective lenses for excitation light irradiation is used for detecting scattered light emitted from the microparticles by the excitation light with which the microparticles are irradiated through another one of the objective lenses for excitation light irradiation; and
an analysis device that analyzes optical information detected by the light detection unit.

(10)
A microparticle sorting system provided with:
a microparticle sorting device provided with
a plurality of objective lenses for excitation light irradiation used for irradiating microparticles flowing through a flow path with excitation light,
a light detection unit that detects fluorescence emitted from the microparticles, and
a sorting unit that sorts the microparticles on the basis of detected optical information, in which
at least one of the objective lenses for excitation light irradiation is used for detecting scattered light emitted from the microparticles by the excitation light with which the microparticles are irradiated through another one of the objective lenses for excitation light irradiation; and
an analysis device that analyzes optical information detected by the light detection unit.

REFERENCE SIGNS LIST 1, 31 Microparticle measurement device
2, 41 Microparticle sorting device
P Flow path
11 Light irradiation unit
12 Light detection unit
L Objective lens
13 Sorting unit
14 Analysis unit
15 Storage unit
16 Display unit
3 Microparticle measurement system
4 Microparticle sorting system
32, 42 Analysis device
33, 43 Storage device
34, 44 Display device

The invention claimed is:

1. A microparticle measurement device, comprising:
a plurality of objective lenses for excitation light irradiation in a plurality of wavelength regions, wherein
the plurality of objective lenses includes a first objective lens and a second objective lens,
the plurality of objective lenses is configured to control irradiation of microparticles flowing through a flow path with the excitation light,
the first objective lens is configured to detect first forward scattered light in an ultraviolet region of the plurality of wavelength regions,
the first forward scattered light in the ultraviolet region is emitted from the microparticles by the excitation light with which the microparticles are irradiated by the second objective lens,
the second objective lens is configured to detect second forward scattered light in a visible region of the plurality of wavelength regions, and
the second forward scattered light in the visible region is emitted from the microparticles by the excitation light with which the microparticles are irradiated by the first objective lens;
a third objective lens different from the plurality of objective lenses, wherein
the third objective lens is configured to detect first side scattered light in the ultraviolet region emitted from the microparticles and second side scattered light in the visible region emitted from the microparticles, and
an axis of the third objective lens is non-axial to an axis of the first objective lens and an axis of the second objective lens;
a light detection unit configured to detect optical information emitted from the microparticles; and
an analysis device configured to analyze the optical information detected by the light detection unit.

2. The microparticle measurement device according to claim 1, wherein the first objective lens is substantially opposed to the second objective lens across the flow path.

3. The microparticle measurement device according to claim 2, wherein the axis of the first objective lens is co-axial with the axis of the second objective lens across the flow path.

4. The microparticle measurement device according to claim 2, wherein the axis of the first objective lens intersects the axis of the second objective lens at a specific angle.

5. The microparticle measurement device according to claim 4, wherein a range of the specific angle is between +30° and −30°.

* * * * *